WILLIAM N. BARTHOLOMEW.
Slate Frame.
No. 125,519.                        Patented April 9, 1872.
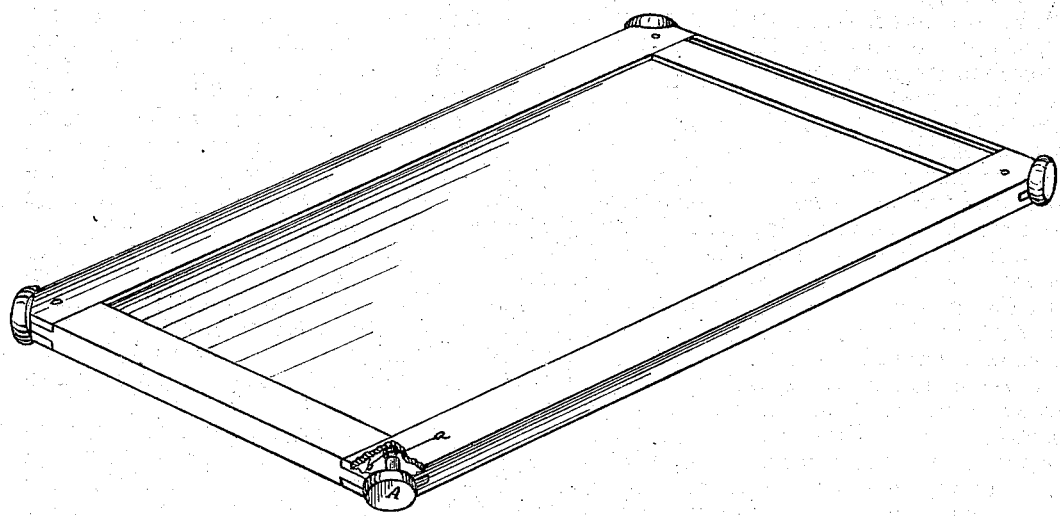
Fig. 1.
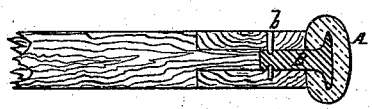      
Fig. 2.        Fig. 3.
Witnesses                              Inventor
E. B. Nottingham.                      William N. Bartholomew
J. R. Nottingham                     by his atty

UNITED STATES PATENT OFFICE.

WILLIAM N. BARTHOLOMEW, OF NEWTON, MASSACHUSETTS.

IMPROVEMENT IN SLATE-FRAMES.

Specification forming part of Letters Patent No. 125,519, dated April 9, 1872.

*To whom it may concern:*

Be it known that I, WILLIAM N. BARTHOLOMEW, of Newton, county of Middlesex, State of Massachusetts, have invented certain new and useful Improvements in India-Rubber Corners for Slate-Frames, of which the following is a specification:

This invention relates to a rubber corner for slate-frames of the same general character as those for which Letters Patent No. 105,712 and No. 116,139 have heretofore been issued to me. My present improvement consists in a novel construction and combination of the metallic shank of the rubber corner with the pin which is driven or inserted in the wooden frame for the purpose of holding the shank in place.

In the accompanying drawing, Figure 1 is a perspective view of a slate made in accordance with my invention, the frame at one corner being broken away to show the arrangement of the shank and its holding-pin. Fig. 2 is a vertical central section longitudinally through the rubber corner and wooden frame immediately adjoining. Fig. 3 is a perspective view of the rubber corner detached.

The rubber head may be attached to the metallic shank B in the manner described in the Letters Patent above named, or in any other suitable manner. A groove, *a*, is formed in and around the shank, near its projecting end, to receive the holding-pin, as hereinafter described. The shank is inserted in a socket of suitable depth in the corner of the slate-frame, formed on a diagonal, or at about an angle of forty-five degrees with each of the adjoining sides of the frame. In this socket it is held by means of the holding-pin *b*, driven or inserted into the frame in such manner as to pass alongside of the shank in the groove *a* formed therein. The pin may also serve to hold together the two adjoining ends of the frame, as in my patent No. 116,139, and I prefer that it should not extend all the way through from one side to the other of the frame.

This mode of constructing the shank and fastening it into the frame is cheap and inexpensive, and will allow the shank and rubber head to be twisted and turned without danger of disconnecting them from the slate-frame.

What I claim, and desire to secure by Letters Patent, is—

1. A rubber corner for slate-frames, composed of a rubber head in combination with a metallic shank provided with a circular groove formed in and around it at or near its projecting end, as and for the purpose set forth.

2. The herein-described combination of the holding-pin and the grooved metallic shank of the rubber corner, the same being applied to and used with a slate-frame, substantially as set forth.

In testimony whereof I have signed my name to this specification before two subscribing witnesses.

WILLIAM N. BARTHOLOMEW.

Witnesses:
JAMES F. C. HYDE,
H. H. FITCH.